US011082217B1

(12) United States Patent
Donlan et al.

(10) Patent No.: US 11,082,217 B1
(45) Date of Patent: Aug. 3, 2021

(54) SESSION RESUMPTION

(71) Applicant: Amazon Technologies, Inc., Seattle, WA (US)

(72) Inventors: Bryan James Donlan, Seattle, WA (US); Douglas Stewart Laurence, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 16/264,354

(22) Filed: Jan. 31, 2019

(51) Int. Cl.
*H04L 9/08* (2006.01)
*H04L 29/06* (2006.01)

(52) U.S. Cl.
CPC .......... *H04L 9/0861* (2013.01); *H04L 9/0819* (2013.01); *H04L 9/0891* (2013.01); *H04L 9/0894* (2013.01); *H04L 29/06965* (2013.01)

(58) Field of Classification Search
CPC ... H04L 9/0861; H04L 9/0894; H04L 9/0891; H04L 9/0819; H04L 29/06965; H04L 29/08045; H04L 63/166
See application file for complete search history.

(56) References Cited

U.S. PATENT DOCUMENTS

| | | | |
|---|---|---|---|
| 8,468,134 B1* | 6/2013 | McHugh | G06F 16/24556 707/638 |
| 2005/0198379 A1* | 9/2005 | Panasyuk | H04L 69/329 709/239 |
| 2006/0155997 A1* | 7/2006 | Fritzges | H04L 63/0428 713/171 |
| 2007/0005973 A1* | 1/2007 | Mynam | H04L 63/123 713/171 |
| 2016/0261632 A1* | 9/2016 | Kolhi | H04L 67/10 |
| 2017/0134357 A1* | 5/2017 | Ohlsson | H04L 67/146 |

OTHER PUBLICATIONS

Blake-Wilson et al., "Elliptic Curve Cryptography (ECC) Cipher Suites for Transport Layer Security (TLS)," Request for Comments: 4492, Informational, May 2006, 35 pages.
Blake-Wilson et al., "Transport Layer Security (TLS) Extensions," Request for Comments: 3546, Standards Track, Jun. 2003, 29 pages.
Blake-Wilson et al., "Transport Layer Security (TLS) Extensions," Request for Comments: 4366, Standards Track, Apr. 2006, 30 pages.

(Continued)

*Primary Examiner* — J. Brant Murphy
(74) *Attorney, Agent, or Firm* — Davis Wright Tremaine LLP

(57) ABSTRACT

Techniques described herein enhance the durability of cryptographically protected communications sessions. The negotiation of a cryptographically protected communications session results in the negotiation of a primary secret and a secondary secret. The primary secret and secondary secret are stored in separate locations, such as in two locations in RAM, one of which being used as a RAM disk. The primary secret is used to cryptographically protect the communications session. Following the detection of a change of state event, the cryptographically protected communications session switches to the secondary secret in place of the primary secret to cryptographically protect the communications session.

20 Claims, 8 Drawing Sheets

(56) References Cited

OTHER PUBLICATIONS

Blumenthal et al., "Pre-Shared Key (PSK) Ciphersuites with NULL Encryption for Transport Layer Security (TLS)," Request for Comments: 4785, Standards Track, Jan. 2007, 5 pages.
Brown et al., "Transport Layer Security (TLS) Authorization Extensions," Request for Comments: 5878, Experimental, May 2010, 19 pages.
Chown, "Advanced Encryption Standard (AES) Ciphersuites for Transport Layer Security (TLS)," Request for Comments: 3268, Standards Track, Jun. 2002, 7 pages.
Dierks et al., "The TLS Protocol Version 1.0," Request for Comments: 2246, Standards Track, Jan. 1999, 75 pages.
Dierks et al., "The Transport Layer Security (TLS) Protocol Version 1.2," Request for Comments: 5246, Standards Track, Aug. 2008, 104 pages.
Eastlake, "Transport Layer Security (TLS) Extensions: Extension Definitions," Request for Comments: 6066, Standards Track, Jan. 2011, 25 pages.
Eronen et al., "Pre-Shared Key Ciphersuites for Transport Layer Security (TLS)," Request for Comments: 4279, Standards Track, Dec. 2005, 15 pages.
Ford-Hutchinson, "Securing FTP with TLS," Request for Comments: 4217, Standards Track, Oct. 2005, 29 pages.
Friend, "Transport Layer Security (TLS) Protocol Compression Using Lempel-Ziv-Stac (LZS)," Request for Comments: 3943, Informational, Nov. 2004, 13 pages.
Gutmann, "Encrypt-then-MAC for Transport Layer Security (TLS) and Datagram Transport Layer Security (DTLS)," Request for Comments: 7366, Standards Track, Sep. 2014, 7 pages.
Hoffman, "SMTP Service Extension for Secure SMTP over Transport Layer Security," Request for Comments: 3207, Standards Track, Feb. 2002, 9 pages.
Hollenbeck, "Transport Layer Security Protocol Compression Methods," Request for Comments: 3749, Standards Track, May 2004, 8 pages.
Kanno et al., "Addition of the Camellia Cipher Suites to Transport Layer Security (TLS)," Request for Comments: 6367, Informational, Sep. 2011, 8 pages.
Kato et al., "Camellia Cipher Suites for TLS," Request for Comments: 5932, Standards Track, Jun. 2010, 6 pages.
Khare et al., "Upgrading to TLS within HTTP/1.1," Request for Comments: 2817, Standards Track, May 2000, 13 pages.
Kim et al., "Addition of the ARIA Cipher Suites to Transport Layer Security (TLS)," Request for Comments: 6209, Informational, Apr. 2011, 9 pages.
Krawczyk et al., "HMAC-based Extract-and Expand Key Derivation Function (HKDF)," Request for Comments: 5869, Informational, May 2010, 14 pages.
Lee et al., "Addition of SEED Cipher Suites to Transport Layer Security (TLS)," Request for Comments: 4162, Standards Track, Aug. 2005, 6 pages.
Mavrogiannopoulos et al., "Using OpenPGP Keys for Transport Layer Security (TLS) Authentication," Request for Comments: 6091, Informational, Feb. 2011, 9 pages.
Mavrogiannopoulos, "Using OpenPGP Keys for Transport Layer Security (TLS) Authentication," Request for Comments: 5081, Experimental, Nov. 2007, 8 pages.
McGrew et al., "AES-CCM Cipher Suites for Transport Layer Security (TLS)," Request for Comments: 6655, Standards Track, Jul. 2012, 8 pages.
McGrew et al., "Datagram Transport Layer Security (DTLS) Extension to Establish Keys for the Secure Real-time Transport Protocol (SRTP)," Request for Comments: 5764, Standards Track, May 2010, 26 pages.
Medvinsky et al., "Addition of Kerberos Cipher Suites to Transport Layer Security (TLS)," Request for Comments: 2712, Standards Track, Oct. 1999, 7 pages.
Merkle et al., "Elliptic Curve Cryptography (ECC) Brainpool Curves for Transport Layer Security (TLS)," Request for Comments: 7027, Informational, Oct. 2013, 10 pages.
Moriai et al., "Addition of Camellia Cipher Suites to Transport Layer Security (TLS)," Request for Comments: 4132, Standards Track, Jul. 2005, 7 pages.
Newman, "Using TLS with IMAP, POP3 and ACAP," Request for Comments: 2595, Standards Track, Jun. 1999, 16 pages.
Phelan, "Datagram Transport Layer Security (DTLS) over the Datagram Congestion Control Protocol (DCCP)," Request for Comments: 5238, Standards Track, May 2008, 10 pages.
Rescorla et al., "Datagram Transport Layer Security Version 1.2," Request for Comments: 6347, Standards Track, Jan. 2012, 32 pages.
Rescorla et al., "Datagram Transport Layer Security," Request for Comments: 4347, Standards Track, Apr. 2006, 25 pages.
Rescorla et al., "Transport Layer Security (TLS) Renegotiation Indication Extension," Request for Comments: 5746, Standards Track, Feb. 2010, 15 pages.
Rescorla, "HTTP Over TLS," Request for Comments: 2818, Informational, May 2000, 7 pages.
Rescorla, "TLS Elliptic Curve Cipher Suites with SHA-256/384 and AES Galois Counter Mode (GCM)," Request for Comments: 5289, Informational, Aug. 2008, 6 pages.
Salowey et al., "AES Galois Counter Mode (GCM) Cipher Suites for TLS," Request for Comments: 5288, Standards Track, Aug. 2008, 8 pages.
Salowey et al., "Transport Layer Security (TLS) Session Resumption without Server-Side State," Request for Comments: 5077, Standards Track, Jan. 2008, 20 pages.
Salter et al., "Suite B Profile for Transport Layer Security (TLS)," Request for Comments: 6460, Informational, Jan. 2012, 14 pages.
Santesson et al., "TLS User Mapping Extension," Request for Comments: 4681, Standards Track, Oct. 2006, 11 pages.
Santesson, "TLS Handshake Message for Supplemental Data," Request for Comments: 4680, Standards Track, Sep. 2006, 9 pages.
Taylor et al., "Using the Secure Remote Password (SRP) Protocol for TLS Authentication," Request for Comments: 5054, Informational, Nov. 2007, 24 pages.
Tuexen et al., "Datagram Transport Layer Security (DTLS) for Stream Control Transmission Protocol (SCTP)," Request for Comments: 6083, Standards Track, Jan. 2011, 9 pages.
Turner et al., "Prohibiting Secure Sockets Layer (SSL) Version 2.0," Request for Comments: 6176, Standards Track, Mar. 2011, 4 pages.
WhatsApp, "WhatsApp Encryption Overview: Technical white paper," Apr. 5, 2016, retrieved Oct. 15, 2019, from www.cdn.whatsapp.net/security/WhatsApp-Security-Whitepaper.pdf, 12 pages.

* cited by examiner

SESSION RESUMPTION

BACKGROUND

In various contexts, managing the security and privacy of communications services is of utmost importance in many organizations. Organizations, for example, often utilize networks of computing devices that must securely communicate with other devices to provide services. These secure communications can pass over other communication networks, and can often span multiple geographic regions. The operations of the organization can depend on the security of the communications; as the size and complexities of such communication networks grow, ensuring proper security, such as forward secrecy, and communication integrity can be increasingly difficult.

The secure communications utilized by many organizations can be susceptible to many interfering factors, such as hardware failure, software failure, and process restarts (e.g., for deployments of updated code). To maintain security of the communications, such interference is often handled, at least in part, by renegotiation of cryptographic sessions. For example, a code deployment can affect a server communicating with a client and a resulting restart can occur before the client and server have finished communicating, requiring the client and server to negotiate a new session. While the computational overhead for a single session negotiation can be insignificant, a server can have many sessions with different clients simultaneously. An event, such as a restart, therefore, can cause a server to be bombarded with session negotiations at the same time, which can tie up computational resources of the server and, therefore, prevent the server from performing its primary functions.

BRIEF DESCRIPTION OF THE DRAWINGS

Various techniques will be described with reference to the drawings, in which.

DETAILED DESCRIPTION

Techniques described and suggested herein relate to the durability of a cryptographically protected communications session (e.g., a transport layer security (TLS) or other encrypted session) such that communications can continue to be cryptographically protected in the event of a failure or change of state of the communications session without immediate negotiation of a new session. Cryptographically protected communications sessions generally involve the encryption of data and the usage of cryptographic secrets. The cryptographic secrets can be generated or derived through one or more cryptographic operations, and each cryptographically protected communications session can utilize multiple cryptographic secrets. Thus, if a cryptographically protected communications session is compromised, the communications can continue to be cryptographically protected with the multiple cryptographic secrets.

In various embodiments, a server system utilizes various cryptographically protected communications sessions with various clients. The cryptographically protected communications sessions can involve sending/receiving encrypted messages. Each cryptographically protected communications session can comprise a primary session secret and secondary session secret. The server system can experience an event (e.g., a network or other failure) that causes a loss of access to the primary session secret (e.g., because the primary session secret is stored in volatile memory to avoid it from being persistently stored). To mitigate effects of the event, the server system can switch to the secondary session secret to cryptographically protect the communications sessions. By utilizing the secondary session secret, the server system can bypass any potential delays in completely re-establishing the cryptographically protected communications sessions to re-determine a new primary sessions secret and new secondary session secret in addition to delaying or completely avoiding the computational overhead associated with negotiation of a new session while maintaining forward secrecy. The server system can then asynchronously re-negotiate the individual cryptographically protected communications session to avoid a mass re-negotiation between the server system and various clients to mitigate any potential delays.

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

Figure 1:
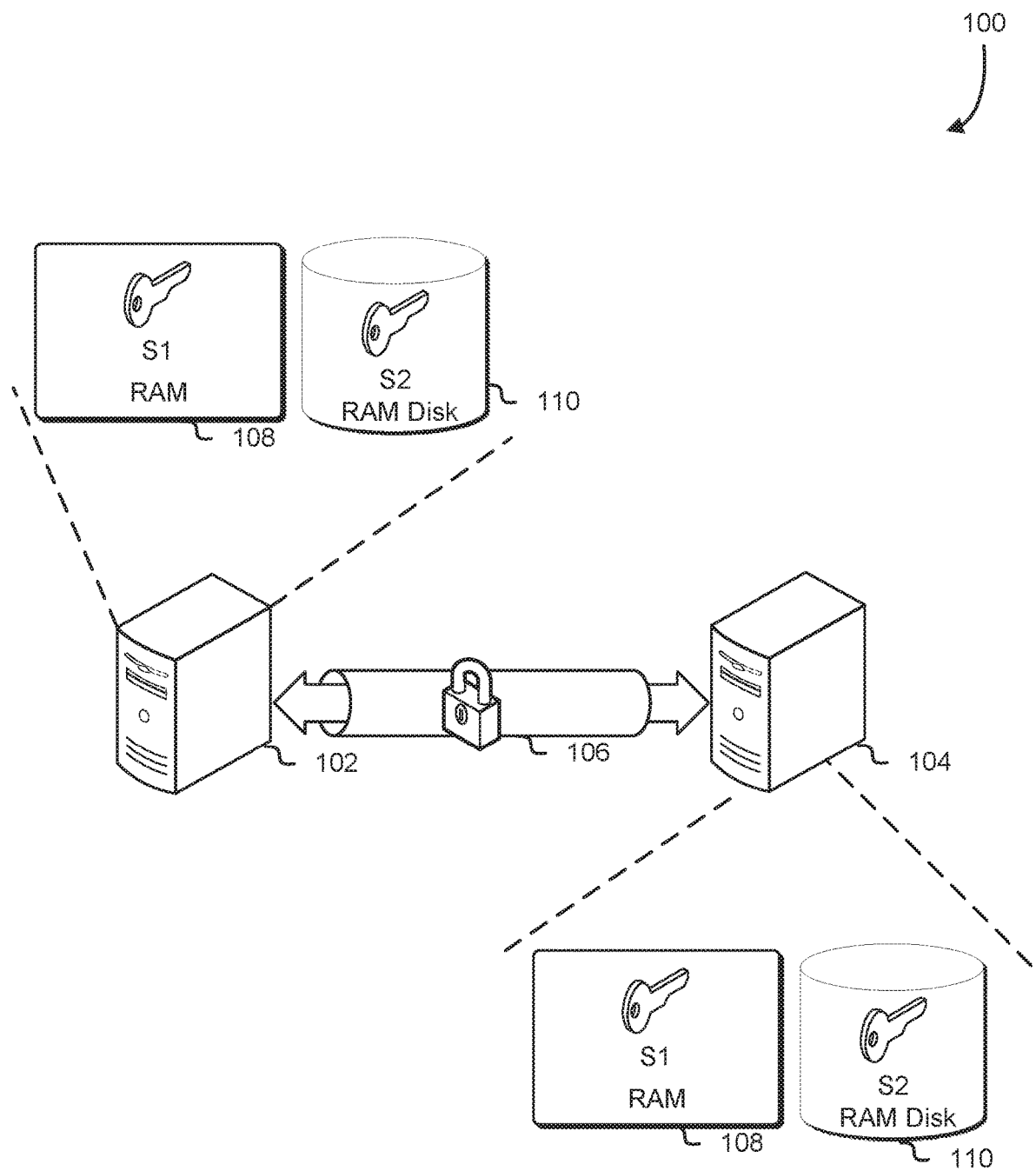
FIG. 1 shows an illustrative example of an implementation of a cryptographically protected communications session, in accordance with at least one embodiment.

FIG. 1 shows an illustrative example of an implementation of a cryptographically protected communications session, in accordance with at least one embodiment. Specifically, FIG. 1 depicts a cryptographically protected communications session 106 between a client system 102 and a server system 104. In the diagram 100, the server system 104 can provide a variety of services. The server system 104 can include a network of one or more local devices, such as a hardware security module (HSM), a trusted platform module (TPM), a cryptographic processor, and/or variations thereof. Additionally or alternatively, the server system 104 can include one or more instances of a physical computing instance, such as a physical server computer, or one or more instances of a virtual computing instance, such as a virtual machine, which can be hosted on one or more computer servers. Other variations are also considered as being within the scope of the present disclosure.

The client system 102 can be any entity operable to access systems such as the server system 104. In some examples, the client system 102 can be one or more instances of a physical computing instance, such as a physical server computer, or one or more instances of a virtual computing instance, such as a virtual machine, which can be hosted on one or more computer servers. Additionally, the client system 102 can include one or more processors, and memory storing instructions executable by the one or more processors. Other variations are also considered as being within the scope of the present disclosure. The client system 102 can communicate to the server system 104 through one or more communication networks, such as the Internet. Further, the various communications to/from the client system 102 can be orchestrated by a browser or other application executing on the client system 102.

The cryptographically protected communications session 106 can be a communications session that utilizes a communication network between the client system 102 and server system 104. The communication network can include any appropriate network, including an intranet, the Internet, a cellular network, a local area network, a satellite network or any other such network and/or combination thereof. In various examples, the cryptographically protected communications session 106 can utilize a protocol or application such as TLS (transport layer security), SSL (secure sockets layer), SSH (secure socket shell), VPN (virtual private network), and/or variations thereof. The cryptographically protected communications session 106 can also be utilized in a computer system process between the client system 102 and server system 104.

In an embodiment, the negotiation of the cryptographically protected communications session 106 between the client system 102 and server system 104 results in determination of cryptographic secret S1 108 and cryptographic secret S2 110. In some examples, a cryptographic secret is a cryptographic key (e.g., a symmetric cryptographic key), passphrase, secret code, biometric authentication information, other supplemental secret, and/or variations thereof. Additionally, a cryptographic secret can be utilized in one or more of the following cryptographic processes: encryption, digital signatures, or otherwise generating data that provides secrecy and/or integrity of the data. For example, a cryptographic secret can be a symmetric key (also known as a secret key) of a symmetric key algorithm, which can be used to cryptographically protect communications between the client system 102 and server system 104 through the cryptographically protected communications session 106. Examples of cryptographic ciphers within symmetric key algorithms include, for example, modes of the Advanced Encryption Standard (AES), Blowfish, Data Encryption Standard (DES), Triple DES, Serpent, Twofish, and/or variations thereof. Further information regarding the negotiation of the cryptographically protected communications session 106 can be found in the description of FIG. 3.

In various examples, the cryptographic secret S1 108 can be denoted as a primary secret, and the cryptographic secret S2 110 can be denoted as a secondary secret. Additionally, the cryptographic secret S1 108 can be utilized as the primary cryptographic secret to cryptographically protect the cryptographically protected communications session 106; the cryptographic secret S2 110 can be utilized in the event of a failure or change of state of the communications session 106. In an embodiment, the cryptographic secret S1 108 and cryptographic secret S2 110 are stored both on the client system 102 and server system 104 to be used as symmetric encryption keys to encrypt and/or decrypt the communications between the client system 102 and server system 104.

Additionally, cryptographic secret S1 108 and/or cryptographic secret S2 110 can be utilized as initial seeds for ratcheting functions, also referred to as cryptographic ratcheting. In an embodiment, a cryptographic secret is used in a ratcheting scheme to determine additional cryptographic secrets. The ratcheting scheme can be initialized along with the initialization and/or negotiation of the cryptographically protected communications session 106. The ratcheting scheme can be continuously run during the operations of the cryptographically protected communications session 106 (e.g., once per message, once per size-based unit of data, once per a number of messages, once per time interval, etc.). The ratcheting scheme can be denoted as a tree ratchet, and can ratchet secrets through the usage of one or more derivation and ratcheting functions. Further information regarding the ratcheting function can be found in the description of FIG. 4.

The cryptographic secret S1 108 can be stored on RAM (Random Access Memory) present on the server system 104 and the client system 102. In various embodiments, RAM is volatile memory in which contents of RAM can be lost during system state changes, such as a restart of a process (e.g., a browser process) that utilizes the cryptographically protected communications session. In some examples, the cryptographic secret S1 108 can be stored on SRAM (Static Random Access Memory), DRAM (Dynamic Random Access Memory), and/or variations thereof; these locations can be denoted as a first storage device. Additionally, the cryptographic secret S2 110 can be stored on a RAM Disk present on the server system 104 and the client system 102. In an embodiment, a RAM Disk is a block or portion of RAM that is utilized by software as a disk storage drive. Additionally, a RAM Disk can be a block or portion of RAM on a system that can persist through system state changes and/or system restarts. For example, a system process can utilize a RAM Disk to store the cryptographic secret S2 110; in the event of the system process stopping, the RAM Disk can continue to comprise the cryptographic secret S2 110, which can be denoted as a secondary session secret. Additionally, the stopping of a system process that utilizes the cryptographically protected communications session can cause the cryptographic secret S1 108, which can be denoted as a first secret, to be no longer stored in the first storage device; the cryptographic secret S2 110, which can be denoted as a second secret, can continue to be stored on a second storage device. The RAM and RAM Disk can be locations directly accessible to a processor of a computer system, such as the server system 104 and the client system 102. The RAM can be denoted as primary storage, and the RAM Disk can be denoted as secondary storage.

In various embodiments, the cryptographic secret S1 108 is stored on a first location comprising volatile memory, and the cryptographic secret S2 110 is stored on a second location (e.g., a second memory device) comprising volatile memory different from the first location; the second location can comprise volatile memory in which the contents of the second location persist longer than the contents of the first location under certain conditions (e.g., a loss of power to the respective memory devices). In some examples, the first location is volatile memory without a battery backup while the second location is volatile memory with a battery backup so that a loss of power to a respective server causes data to be lost from the first location but to continue to be stored in the second location. In some embodiments, the battery backup is controlled at least in part by a timer circuit which removes battery power after expiration of a timer to ensure secrets stored in the second location are not persistently stored more than necessary, such as a time sufficient to enable the server to power up and utilize secondary secrets to continue respective sessions. Additionally, the first location and second location can be locations directly accessible to a processor of the client system 102 and the server system 104. The second location can also be addressable as a part of a file system of an operating system the client system 102 and/or server system 104 can comprise. In some examples, the second location can be a RAM Disk addressable as a part of a file system.

It should be noted that in some examples, the cryptographic secret S2 110 is not stored on a RAM Disk as described above. For example, the cryptographic secret S2 110 can be stored on various data storage systems and/or devices; these locations can be denoted as a second storage device. In various embodiments, a data storage system can be a collection of computing resources, physical and/or virtual, configured to operate, store, and/or access data. A data storage system can store data objects on one or more physical computing instances, such as a physical computing server, or one or more virtual computing instances, such as a virtual machine; these computing instances can also be a part of a larger network of computing instances. The data storage system can also operate a cryptographic secret service in which cryptographic secret are stored for various cryptographic operations, such as encryption, decryption, and/or variations thereof. Additionally, the cryptographic secret S2 110 can be stored on devices such as SRAM, DRAM, and/or variations thereof. In some examples, the cryptographic secret S2 110 can be stored on RAM comprising a battery and/or capacitor back-up which can utilize various timing circuits, which can result in the contents of the RAM persisting through system state changes and/or system restarts.

The cryptographic secret S2 110 can be segmented into several parts and stored amongst various data storage systems and/or devices; access to each of the parts can be required to fully reconstruct the cryptographic secret S2 110. The cryptographic secret S2 110 can also be obtained by satisfying a set of quorum conditions; quorum conditions can include requiring a certain number of parts and/or shares to construct the cryptographic secret S2 110. For example, the cryptographic secret S2 110 can be segmented into shares in which each individual share is insufficient to obtain the cryptographic secret S2 110; a quorum condition such as requiring the obtainment of a portion of the shares must be satisfied to obtain the cryptographic secret S2 110. The cryptographic secret S2 110, which can be denoted as a second secret, can also be encrypted and stored on a second storage device; the cryptographic secret S2 110 can require decryption to be utilized. In some examples, devices such as a TPM (Trusted Platform Module), HSM (Hardware Security Module), disk drive, and/or other system can be also utilized to determine and/or obtain the cryptographic secret S2 110.

Figure 2:
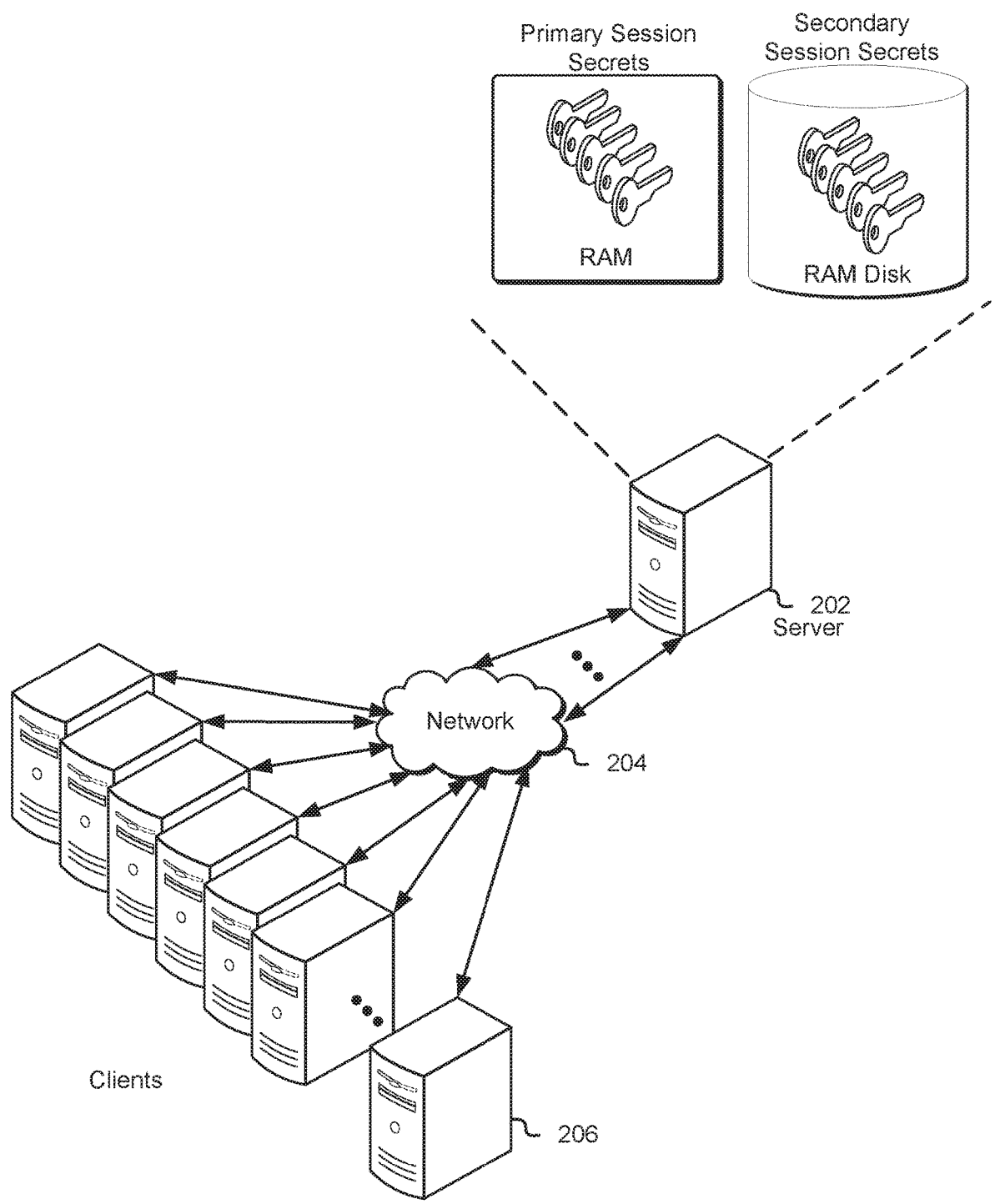
FIG. 2 shows an illustrative example of a system employing cryptographically protected communications sessions, in accordance with at least one embodiment.

FIG. 2 shows an illustrative example of a system employing cryptographically protected communications sessions, in accordance with at least one embodiment. Specifically, FIG. 2 depicts various cryptographically protected communications sessions via a network 204 between a server system 202 and multiple client systems 206. In the diagram 200, a server system 202 can provide a variety of services to the client systems 206. The server system 202 can also provide services in which a secure communication session is desired between the server system 202 and an individual client system. Such services can include, but are not limited to, messaging services, cryptographic operations, and/or variations thereof. Multiple clients can utilize the services of the server system 202, and one or more client systems that the client systems 206 comprises can simultaneously utilize the services of the server system 202. These services can entail the usage of cryptographically protected communications sessions, which can utilize the network 204.

The establishment of a cryptographically protected communications session can entail a negotiation in which a primary session secret and secondary session secret are derived between the server system 202 and a client system. Multiple negotiations can be performed with a plurality of client systems the client systems 206 comprises. Further information regarding the negotiation of the cryptographically protected communications session can be found in the description of FIG. 3. The cryptographically protected communication sessions between the server system 202 and client systems 206 can utilize a network 204. In some examples, the network 204 can be a communication network such as the Internet, cellular network, and/or variations thereof. The server system 202 can store multiple primary session secrets and multiple secondary session secrets in response to the negotiation of a plurality of cryptographically protected communication sessions with the client systems 206. The primary session secrets can be stored on RAM present on the server system 202; the secondary session secrets can be stored on a RAM Disk present on the server system 202.

In an embodiment, the primary session secrets are utilized to cryptographically protect communications between the server system 202 and individual client systems the client systems 206 comprises. In some examples, a session secret can be a cryptographic key, passphrase, secret code, biometric authentication information, other supplemental secret, and/or variations thereof. For example, a session secret can be a symmetric key of a private key cryptosystem, also known as symmetric key algorithms, which can be used to cryptographically protect communications between the server system and individual client systems the client systems comprises through the network. Examples of cryptographic ciphers within symmetric key algorithms include, for example, modes of the Advanced Encryption Standard (AES), Blowfish, Data Encryption Standard (DES), Triple DES, Serpent, Twofish, and/or variations thereof. Additionally, the primary session secrets can be utilized as the primary cryptographic secret to cryptographically protect a cryptographically protected communications session between the server system 202 and an individual client system; the secondary session secrets can be utilized in the event of a failure or change of state of the network, server system, and/or client system(s).

The plurality of cryptographically protected communication sessions utilizing the network 204 can be susceptible to interference and loss. Sources of such interference and loss can include spectral interference, multipath interference/loss, and/or variations thereof. Interference and loss can also be intentionally caused by inside and/or outside malicious actors. Other variations are also considered as being within the scope of the present disclosure. The interference and loss can cause the failure or change of state of one or more cryptographically protected communications sessions of the plurality of cryptographically protected communications sessions utilizing the network 204.

The failure or change of state of one or more cryptographically protected communications sessions can require one or more re-negotiations utilizing the network 204 to determine new primary session secrets and secondary session secrets to re-establish. The re-negotiations can be performed asynchronously to reduce the load on the network 204; for example, an event can cause the failure of the network 204. The network 204 can be restored; the restoration can require a mass re-negotiation of one or more cryptographically protected communications sessions between the server system 202 and client systems 206. To mitigate the potential traffic and load on the network 204, the server system 202 can asynchronously re-negotiate the cryptographically protected communications sessions. This can entail utilizing stored secondary session secrets to maintain a portion of the cryptographically protected communications sessions whilst the remainder of the cryptographically protected communications sessions are re-negotiated to determine new primary session secrets and new secondary session secrets. In some examples, various APIs (Application Programming Interface) which can be invoked to access the stored secondary session secrets due to a failure or change of state can be disabled to ensure the security of the stored secondary session secrets. This process can be utilized until all of the cryptographically protected communications sessions between the server system 202 and client systems 206 are re-negotiated with new primary and secondary session secrets. In an embodiment, asynchronously re-negotiating cryptographically protected communication sessions between the server system 202 and client systems 206 allows for a reduced workload on the network 204. In some examples, the re-negotiated cryptographically protected communications sessions can be denoted as the second encrypted communications sessions; the initial cryptographically protected communications sessions can be denoted as the first encrypted communications sessions and can be stopped following the establishment of the second encrypted communications sessions.

Additionally, in some examples, the re-negotiation of the cryptographically protected communications sessions by the server system 202 can utilize various methods and delays to mitigate potential traffic and load on the network 204. In various embodiments, the re-negotiation of a cryptographically protected communications session can be denoted as a handshake. For example, the server system 202 can initiate handshakes to re-establish encrypted communications sessions based on the order in which the encrypted communications sessions were established initially. In an alternative example, the server system can initiate handshakes to re-establish encrypted communications sessions based on a priority system, in which encrypted communications sessions denoted as higher priority can be initiated first. Other variations of delays on re-establishing the plurality of encrypted communications sessions are also considered as being within the scope of the present disclosure.

Figure 3:
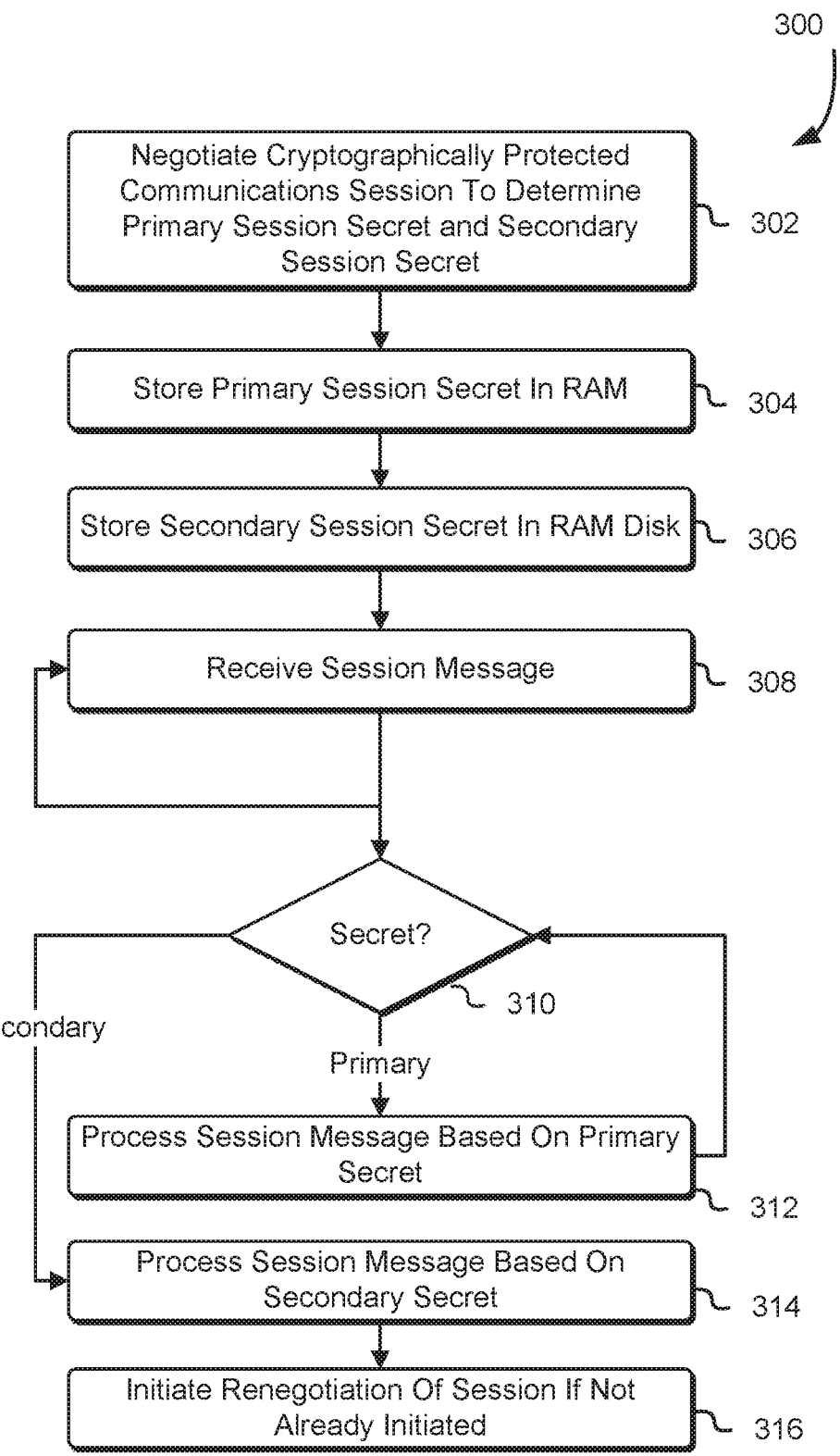
FIG. 3 shows a diagram illustrating a process for communicating over a cryptographically protected communications session, in accordance with at least one embodiment.

FIG. 3 shows a diagram illustrating a process 300 for communicating over a cryptographically protected communications session, in accordance with at least one embodiment. The process 300 can be performed by any suitable system, such as a client system or server system configured with executable instructions for communicating with one or more other systems. In an embodiment, the process 300 includes negotiate 302 cryptographically protected communications session to determine primary session secret and secondary session secret. The negotiation of the cryptographically protected communications session can utilize various methods of protocols or applications such as TLS (transport layer security), SSL (secure sockets layer), SSH (secure socket shell), VPN (virtual private network), and/or variations thereof. Generally, embodiments of the present disclosure can use methods of various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366, which are incorporated herein by reference, in the negotiation of a cryptographically protected communications session.

The negotiation of the cryptographically protected communications session, which can be denoted as a first encrypted communications session, which in some examples can be denoted as a handshake, can determine a primary session secret and secondary session secret. In some examples, a session secret can be a cryptographic secret, which can include a cryptographic key, passphrase, secret code, biometric authentication information, other supplemental secret, and/or variations thereof. Additionally, a session secret can be utilized in one or more of the following cryptographic processes: encryption, digital signatures, or otherwise generating data that provides secrecy and/or integrity of the data. In various embodiments, the primary session secret and secondary session secret are derived from a symmetric secret produced as a result of the one or more processes that the negotiation of a cryptographically protected communications session comprises. The symmetric secret can be produced as a result of a key agreement scheme, such as the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Additionally, elliptic curve algorithms such as the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme can be utilized. Other algorithms and combinations of algorithms are also considered as being within the scope of the present disclosure and the above is not intended to be an exhaustive list.

In an embodiment, a key agreement scheme, such as the elliptic curve Diffie-Hellman (ECDH) key agreement scheme, is utilized between two systems to produce a negotiated symmetric secret. The negotiated symmetric secret can utilized in a function to derive additional secrets: a primary session secret and/or secondary session secret. In various embodiments, the function utilized to derive the additional secrets can be a key derivation function. A key derivation function, in an embodiment, is a set of one or more pseudorandom functions, such as a keyed cryptographic hash function, that derive cryptographic keys from one or more input values. The input values can include other cryptographic keys, plaintext, ciphertext, and/or various combinations thereof. In some examples, a key derivation function can be hash-based message authentication code (HMAC) based, such as the HMAC based key derivation function (KDF) described in RFC (Request For Comments) 5869. The HMAC based KDF can include, but is not limited to, cryptographic hash functions such as the secure hash algorithm (SHA) family. Examples of the potential SHA utilized can include SHA-224, SHA-256, SHA-384, SHA-512, and/or variations thereof. Other variations of the key derivation function are also considered as being within the scope of the present disclosure. Additionally, in some examples, the secondary session secret can be derived by utilizing a cryptographic ratcheting scheme with the primary session secret to determine the secondary session secret. The cryptographic ratcheting scheme can be a tree ratchet such as the tree ratchet described in connection with FIG. 4, or other variations of a ratcheting structure.

The system performing process 300 can store 304 primary session secret in RAM (random access memory). In various embodiments, RAM is a medium for the storage of computer data. RAM can comprise various static components, and can be designed as volatile memory, in which the memory requires access to a power source to maintain the stored information. The volatility of RAM can result in a loss of the data stored on the RAM if power to the system powering the RAM or the RAM itself is lost. Additionally, the system can store 306 secondary secret in RAM Disk. In some examples, RAM Disk can refer to a block or portion of RAM that is utilized by a system as a disk storage drive; the contents of RAM Disk can persist through system state changes, system restarts, and/or power changes.

The system performing process 300 can receive 308 or otherwise obtain session message from the cryptographically protected communications session negotiated earlier. The session message can be an object of data, such as a sequence of bits; the bits can correspond to a plaintext message and/or other form of communication medium. The session message can also be cryptographically protected; the cryptographic protection can utilize a symmetric key cryptosystem comprising one or more cryptographic ciphers such as modes of the Advanced Encryption Standard (AES), Blowfish, Data Encryption Standard (DES), Triple DES, Serpent, Twofish, and/or variations thereof. The session message can also require a cryptographic secret to decrypt, such as the primary session secret stored in RAM and/or the secondary session secret stored in RAM Disk.

In some examples, the system can continue to receive 308 session messages as a part of the cryptographically protected communications session. The system can store the received messages in a data store, such as a buffer, which can be present on the system. Additionally or alternatively, the system can store the received messages in a data storage service, which can be present on one or more other systems. Generally, the system can store received messages in one or more collections of computing resources, physical and/or virtual, configured to operate, store, and/or access data. The system can utilize the buffer to process the session messages individually; for example, a system can be receiving a constant stream of session messages. The session messages can be stored in a buffer, and retrieved individually from the buffer to be processed.

The session message can comprise an indication of which secret 310 was utilized to cryptographically protect the session. The indication can be metadata identifying certain facets of the session message, such as the specific resources that were utilized in the generation of the session message. The system can determine, based on the indication and/or other supplemental information, which secret 310 was utilized in the generation of the session message. In some examples, determining which secret 310 was utilized can comprise detecting a switch from a utilization of a primary secret to a secondary secret in the generation of the received session message. The switch can be detected by detecting an indicator the received message can comprise. The switch can also be detected through the detection of a deployment to update code of a process utilizing the cryptographically protected communications session. The detection of the switch can determine which secret the system should utilize in the cryptographically protected communications session; a detection of a switch to a secondary secret can result in the system utilizing the second secret for the cryptographically protected communications session (i.e., the second secret can replace the first secret to cryptographically protect communications).

The system can determine that the primary session secret was utilized in the generation of the session message; the system can then process 312 session message based on primary secret. Alternatively, the system can determine that the secondary session secret was utilized in the generation of the session message; the system can then process 314 session message based on secondary secret. Additionally, in response to the determination that the secondary session secret was utilized, the system can clear the primary session secret from RAM, which can be denoted as the first location, without clearing the secondary session secret. In various examples, a system can process a session message by utilizing a cryptographic secret and a cryptographic cipher to decrypt the session message. The cryptographic cipher can be a part of a symmetric key cryptosystem as described in the preceding paragraphs. For example, a system can receive an encrypted session message in the form of cipher text; an indicator present with the encrypted message can denote that a secondary secret was utilized, and the system then can utilize the secondary secret to decrypt the session message into plaintext. In some examples, the system can determine that it is unable to process the session message. The system can be no longer comprising a primary secret and/or secondary session secret; this can result in a complete renegotiation of the cryptographically protected communications session.

Following the processing of the session message, the system can then initiate 316 renegotiation of session if not already initiated. In an embodiment, the system renegotiates the cryptographically protected communications session if there are no cryptographically protected communications sessions currently running. In some examples, the system can renegotiate the session in the manner described in the preceding paragraphs in connection with negotiate 302 cryptographically protected session to determine a new primary session secret and new secondary session secret; the new primary session secret and new secondary secret can be denoted as a third secret and a fourth secret. Following the re-negotiation of the cryptographically protected communications session, which can be denoted as a second encrypted communications session, the old secondary secret can be deleted.

Figure 4:
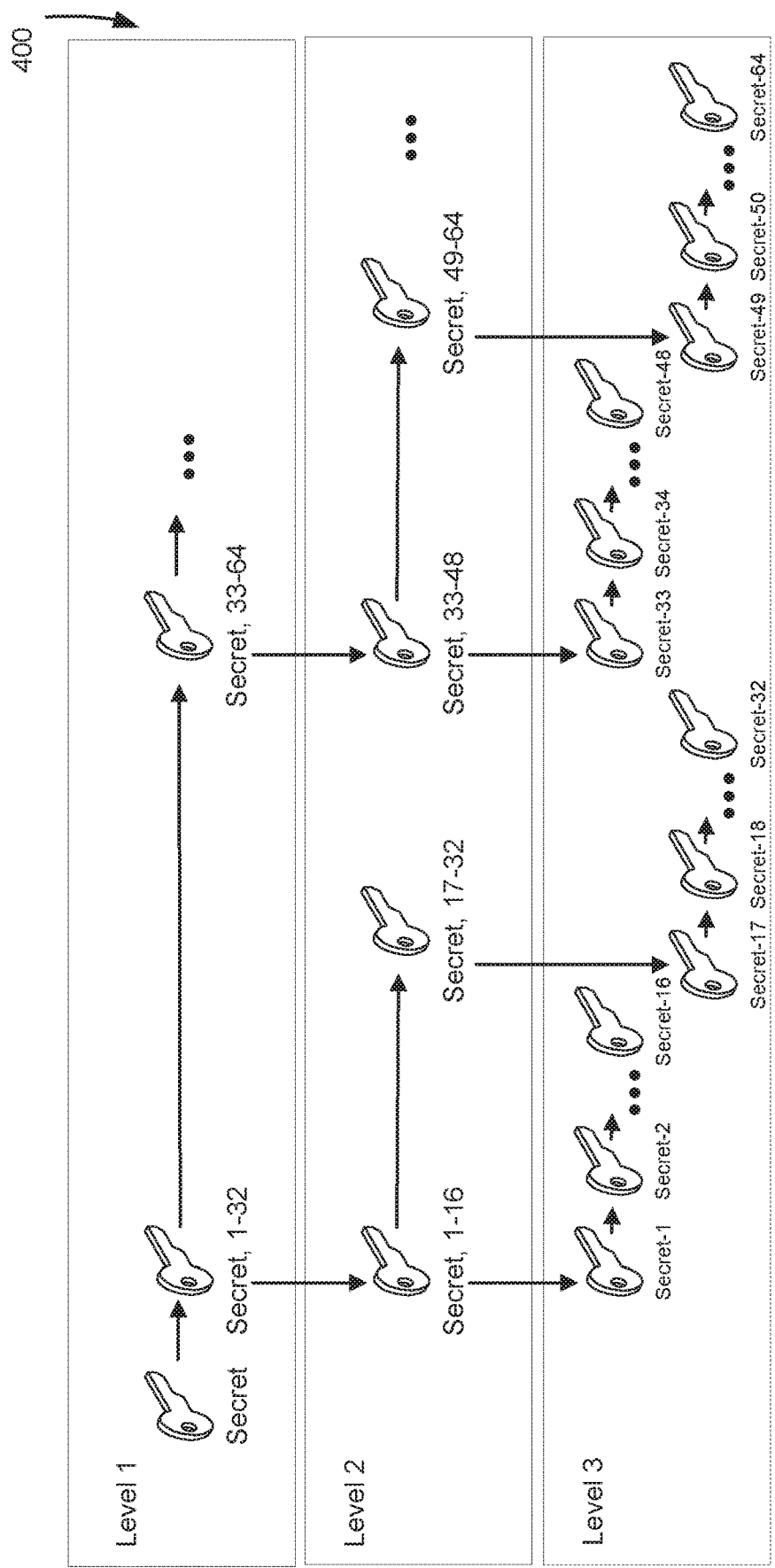
FIG. 4 shows an illustrative example of a cryptographic ratcheting scheme in accordance with at least one embodiment.

FIG. 4 shows an illustrative example of a cryptographic ratcheting scheme in accordance with at least one embodiment. Specifically, FIG. 4 depicts a cryptographic ratcheting scheme, which in some embodiments can be denoted as a tree ratchet. In an embodiment, a tree ratchet utilizes an initial cryptographic secret to derive (i.e., ratchet to) other cryptographic secrets the remainder of the tree comprises. In some examples, the derivations, or ratchets, denoted as an arrow in FIG. 4, can be achieved by utilizing a key derivation function. A key derivation function, in an embodiment, is a set of one or more pseudorandom functions, such as a keyed cryptographic hash function, that derive cryptographic keys from one or more input values. The input values can include other cryptographic keys, plaintext, ciphertext, and/or various combinations thereof. In some examples, a key derivation function can be hash-based message authentication code (HMAC) based, such as the HMAC based key derivation function (KDF) described in RFC (Request For Comments) 5869. Additionally, a key derivation function can be utilized in a tree ratchet such that the original input values cannot be reconstructed from the output value (e.g., cryptographic secrets derived (i.e., ratcheted) from a cryptographic secret cannot be used to reconstruct the original cryptographic secret). Note that other one-way functions (i.e., functions that are computationally impractical to invert) are also considered as being within the scope of the present disclosure.

In some examples, an initial cryptographic secret, denoted as "Secret" in FIG. 4, can be utilized as an input to a key derivation function; a new secret, denoted as "Secret, 1-32", can then be ratcheted from the initial cryptographic secret. Correspondingly, the other secrets depicted in FIG. 4 can be ratcheted from previously ratcheted secrets. The permutation in which the secrets are ratcheted can follow the depicted direction of the arrows. For example, "Secret, 1-32" can be used to ratchet "Secret, 33-64" as well as "Secret, 1-16"; "Secret, 1-16" can be used to ratchet "Secret-1" as well as "Secret, 17-32", and so on with the remainder of the secrets. In an embodiment, the secrets the lowest level of a tree ratchet comprises corresponds to the ranges depicted in the secrets the ascending levels comprise. The secrets the ascending levels comprise can also be denoted as seeds, in which the secrets the lowest level of the tree ratchet are ratcheted from. FIG. 4, as an example, depicts this structure; secret 1, denoted as "Secret-1", through secret 16, denoted as "Secret-16", can be ratcheted from a secret on the ascending level, specifically the secret with the range 1-16 denoted, depicted as "Secret, 1-16". This structure is similarly followed for the next level, in which "Secret, 1-16" and "Secret, 17-32" can be ratcheted from "Secret, 1-32" on the ascending level. It should be noted that, unless explicitly contradicted or otherwise clear from context, the ranges of ratcheted secrets from a secret can vary based on implementation. For example, a tree ratchet can contain a secret with a larger range, such as "Secret, 1-64", or a smaller range, such as "Secret, 1-8"; additionally, various ranges can be utilized, such as a "Secret, 1-25", from which "Secret-1" through "Secret-25" can be ratcheted from.

Additionally, the tree ratchet can be constructed sequentially by index; in some examples sequentially can refer to a numerical order in which each subsequent value is numerically larger than the previous value by a fixed margin. For example, the tree ratchet depicted in FIG. 4 can begin with an initial secret, denoted as "Secret". The following secret, "Secret, 1-32" can then be ratcheted, and from that "Secret, 1-16" can be ratcheted; "Secret-1" through "Secret-16" can be sequentially ratcheted from "Secret, 1-16". Following the ratcheting of "Secret-16", the tree can return to "Secret, 1-16" to ratchet "Secret, 17-32", from which "Secret-17" through "Secret-32" can be ratcheted sequentially. A similar process can be applied to the ratcheting of "Secret-33" through "Secret-64". Furthermore, the tree ratchet can contain additional levels not depicted in FIG. 4. For example, a top level of a tree ratchet can contain a secret denoted as "Secret, 1-64". The "Secret, 1-64" can be used to ratchet to an additional level comprising "Secret, 1-32" and "Secret, 33-64", from which two additional levels can be ratcheted. Generally, it should be noted that, unless explicitly contradicted or otherwise clear from context, a tree ratchet can contain any number of levels.

In various embodiments, the construction of the tree ratchet can utilize a HMAC based KDF (key derivation function). In some examples, a HMAC based KDF can comprise the following inputs to ratchet to a secret: Ratcheted Secret=HMAC KDF (Secret, Level, Horizontal Index).

The input "Secret" can be a secret in which the ratcheted secret is ratcheted from. The input "Level" can be the value of the level the ratcheted secret will reside. The input "Horizontal Index" can be the value of the horizontal index the ratcheted secret will reside. For example, the initial cryptographic secret, denoted as "Secret", can be utilized in a HMAC KDF as an input, along with a "Level" value of "1", and a "Horizontal Index" value of "2" to ratchet to a cryptographic secret denoted as "Secret, 1-32". "Secret, 1-32", can be utilized as an input to two HMAC KDF's, to ratchet to "Secret, 33-64" and "Secret, 1-16"; to ratchet to "Secret, 33-64", "Secret, 1-32" as well as a "Level" value of "1" and "Horizontal Index" value of "3" can be utilized. To ratchet to "Secret, 1-16", "Secret, 1-32" as well as a "Level" value of "2" and a "Horizontal Index" value of "1" can be utilized. A similar format can be followed to ratchet to the remainder of the cryptographic secrets the tree ratchet comprises. It should be noted that the inputs to the HMAC based KDF can vary based on implementation, and other derivation functions can be utilized; other variations are also considered as being within the scope of the present disclosure In some examples, the initial cryptographic secret, denoted as "Secret" or a "seed," can also be a primary session secret, such as the primary session secret described in connection with FIG. 1, FIG. 2, and FIG. 3. In an embodiment, the primary session secret utilizes cryptographic ratcheting to generate a plurality of secrets. The plurality of secrets can utilize the tree ratchet structure as described in the preceding paragraphs, and can comprise at least two levels. In various embodiments, the levels of the tree ratchet can be denoted as degrees; for example, a tree ratchet comprising secrets with at least two levels can be denoted as a tree ratchet comprising nodes (i.e., secrets) with a degree of at least two. In some examples, the secrets of the tree ratchet can be denoted as nodes; the nodes of the tree ratchet can be utilized to encrypt communications between systems. The secrets of the tree ratchet can be utilized to encrypt messages a cryptographically protected communications session comprises; for example, a secret can be utilized to encrypt a message. The secret can then be ratcheted to determine another secret, which can be utilized to encrypt a subsequent message. While the example in FIG. 4 shows ratcheting in two dimensions (horizontally and vertically, in the figure), other embodiments implement more than two dimensions where, for example, a node in the tree can be ratcheted in three more different ways to generate different seeds to be ratcheted to generate keys. In such a tree, there can be a predetermined way of traversing the tree (by ratcheting) so that keys are used in sequential order.

Additionally or alternatively, the initial cryptographic secret, denoted as "Secret" in FIG. 4, can be a spare session secret, such as the spare session secret described in connection with FIG. 1, FIG. 2, and FIG. 3. The spare session secret can be ratcheted sequentially following the establishment of a cryptographically protected communications session. The ratcheting can be performed by both parties involved in the cryptographically protected communications session; the tree ratchet formed can determine which cryptographic secret should be utilized in the event of a failure or change of state. In an embodiment, the tree ratchet structure is utilized to indicate which spare session secret should be used to re-establish a cryptographically protected communications session following an event in which the cryptographically protected communications session experiences interference or loss of communication. In an alternative embodiment, following a loss of communication or change of state, the tree ratchet structure can ratchet the spare session secret to encrypt messages in a manner described in the preceding paragraph.

The primary session secret can be utilized in the tree ratchet structure to encrypt and/or decrypt messages as a part of a cryptographically protected communications session. For example, a system can utilize the primary session secret to encrypt a first message as part of a cryptographically protected communications session. A receiving system can receive the encrypted first message, and utilize the primary session secret to decrypt the encrypted first message. The system can then cryptographically ratchet the primary session secret to determine another secret, and use the newly ratcheted secret to encrypt a second message. The receiving system can also cryptographically ratchet the primary session secret, and decrypt the second message in a similar manner. The receiving system can also verify the second message such that it has not been encrypted by a previously used encryption key; the receiving system cannot decrypt messages that have utilized previously used encryption keys. In some examples, the verification process of the receiving system can be denoted as deduplication protection; further information regarding deduplication can be found in the description of FIG. 5. It should be noted that in some examples, the primary session secret cannot be used to encrypt/decrypt messages as described above, and can be used primarily to cryptographically ratchet to other secrets. The primary session secret can be used to cryptographically ratchet to other secrets; secrets derived from the primary session secret and other subsequently ratcheted secrets can be used encrypt/decrypt messages.

The state of the tree ratchet can be stored by parties involved in the cryptographically protected communications session to indicate which secret to ratchet to in the event of failure. For example, two parties can be communicating through a cryptographically protected communications session. The establishment of the session can result in both parties determining a session secret; additionally, both parties can utilize their own session secret in a tree ratcheting scheme. The cryptographically protected communications session can experience a failure of a party. The failed party can resume operations; however, the tree ratchet of the non-failed party can be at a secret significantly sequentially further than the tree ratchet of the failed party due to the tree ratchet of the non-failed party continuing to ratchet whilst the tree ratchet of the failed party has ceased ratcheting due to failure. The failed party can then utilize the stored state of the tree ratchet, to ratchet to the specific secret the non-failed party is at. The non-failed party can be at a secret denoted as "Secret-17"; the failed party can begin with the initial secret, denoted "Secret", to ratchet to "Secret, 1-32". "Secret, 1-32" can be utilized to ratchet to a level down, to "Secret, 1-16", which can be utilized to ratchet to "Secret, 17-32", which can be utilized to ratchet to the desired secret "Secret-17". Following the restoration of the stored state, the failed party can utilize "Secret-17" to re-establish the cryptographically protected communications session with the non-failed party. In some examples, the re-establishment of a session can entail using the secret as a cryptographic key with a cryptographic cipher to encrypt/decrypt communications between parties. Additionally, the state of the tree ratchet can be stored on a system each party comprises, and can be present on the RAM Disk of the system.

Additionally or alternatively, the tree ratchet can be utilized by parties a cryptographically protected communications session comprises to derive encryption keys. For example, a party can utilize a secret, which can be denoted as a primary secret, to derive an encryption key used to encrypt and send a message to a receiving party. Subsequent messages can utilize cryptographically ratcheted secrets from the primary secret to derive additional encryption keys. In some examples, the receiving party can experience a failure or change of state. The receiving party can then utilize the tree ratchet structure to skip over subsequences of the ascending sequence of the tree ratchet to obtain the desired encryption key to decrypt a received message. In various embodiments, cryptographically ratcheting secrets allows a cryptographically protected communications session to utilize forward secrecy, in which previously encrypted messages a cryptographically protected communications session comprises cannot be decrypted with the most current cryptographic secret. For example, a cryptographically protected communications session can comprise a sequence of multiple encrypted messages; each subsequent encrypted message can utilize a cryptographic secret ratcheted from a previous cryptographic secret utilized to cryptographically protect the previous message. Therefore the cryptographic secret an encrypted message utilizes cannot be utilized to decrypt any previously encrypted messages, because the cryptographic secret has been ratcheted from a previous secret needed to decrypt a previously encrypted messages; as discussed in the preceding paragraphs, cryptographic ratcheting utilizes derivation functions that are "one-way" (i.e., outputs from a derivation function cannot reconstruct the inputs to the derivation function).

The tree ratchet can also utilize a deduplication window to determine which range of secrets are suitable for usage. The deduplication window can consistently iterate through a range of secrets; only secrets within that range can be utilized to re-establish a cryptographically protected communications session and/or cryptographically process communications. The deduplication window can also prevent the usage of previously used secrets. Further information regarding the deduplication window can be found in the description of FIG. 5.

Figure 5:
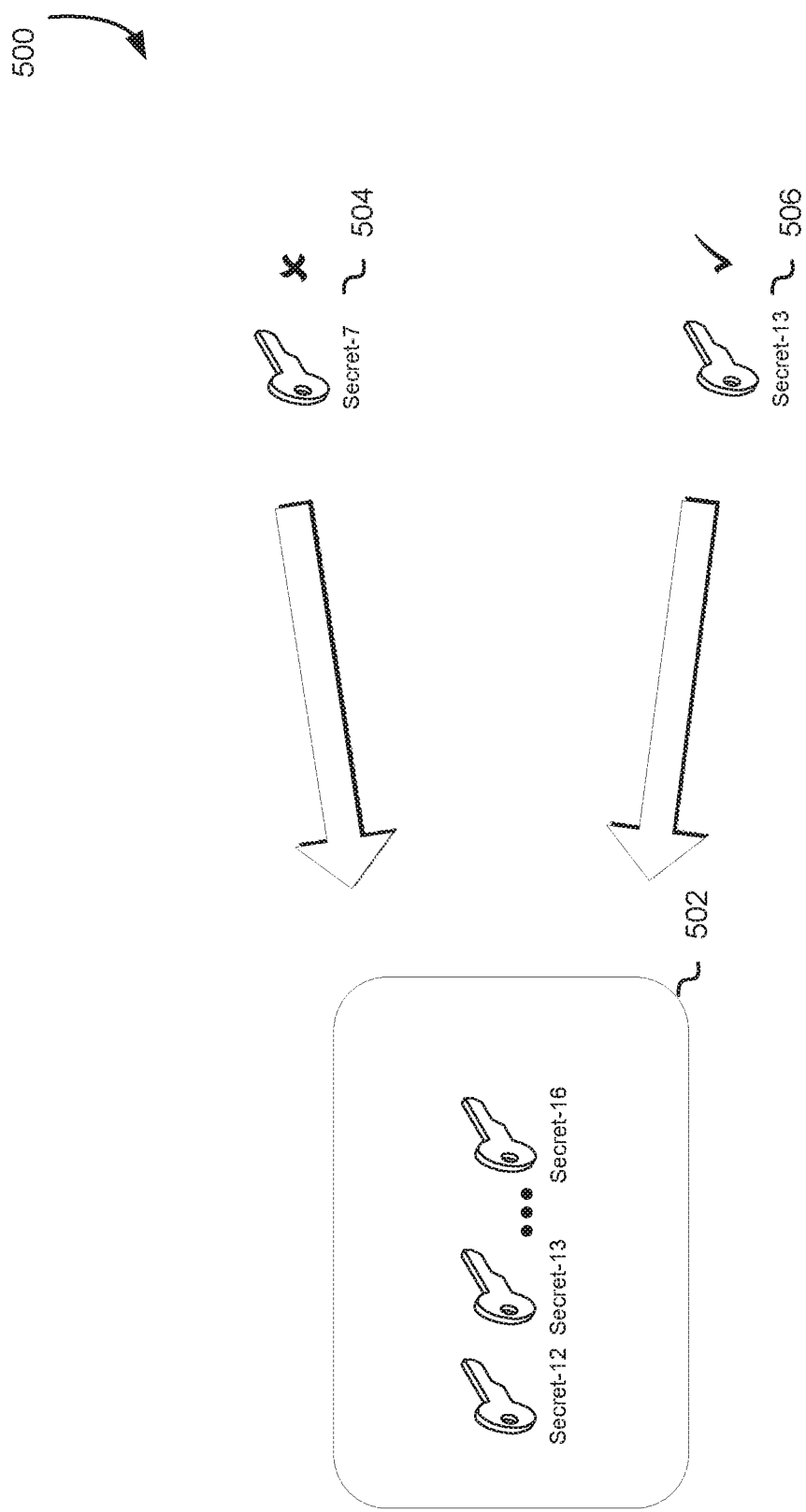
FIG. 5 shows an illustrative example of a deduplication window in accordance with at least one embodiment.

FIG. 5 illustrates a diagram 500 in which various embodiments can be implemented. Specifically, FIG. 5 depicts a window 502 indicating a range of cryptographic secrets; in some embodiments, the window 502 can be denoted as a deduplication window. The window 502 can indicate a range of specified cryptographic secrets in a sequence. The window 502 can, for instance include identifiers of the secrets. In some examples, a cryptographic secret is a cryptographic key, passphrase, secret code, biometric authentication information, other supplemental secret, and/or variations thereof. Additionally, a cryptographic secret can be utilized in one or more of the following cryptographic processes: encryption, digital signatures, or otherwise generating data that provides secrecy and/or integrity of the data. For example, window 502 comprises a range of secrets from "Secret-12" to "Secret-16". In this example, the window can comprise the values 12 through 16, without storing the corresponding secrets themselves although, in some embodiments, the window comprises the secrets themselves.

In some examples, the cryptographic secrets the window 502 comprises are secrets produced from a tree ratcheting structure, such as the tree ratchet described in connection with FIG. 4, and/or or identifiers of the corresponding secrets. The secrets can be cryptographic secrets ratcheted from an initial cryptographic secret produced as a result of the negotiation of a cryptographically protected communications session. In an embodiment, the negotiation of a cryptographically protected communications session determines a session secret; the session secret can be used in a tree ratcheting structure, which can utilize a deduplication window comprising a specific range of cryptographic secrets. The cryptographic secrets the deduplication window comprises can be utilized to re-establish a cryptographically protected communications session in the event of a failure or change of state. In some examples, the cryptographic secrets the deduplication window comprises can denote which cryptographic secrets are acceptable for cryptographic processes such as the encryption and/or decryption of communications. Additionally, the deduplication window can follow the sequence of the tree ratchet; the deduplication window can comprise a range that continuously comprises the currently ratcheted secret as the tree ratchet grows. The range can comprise the current ratcheted secret as well as upper and lower bounds comprising the current ratcheted secret. While FIG. 5 depicts a window 502 with an upper bound of "Secret-16" and lower bound of "Secret-12", it should be noted that the range of the upper and lower bounds of the deduplication window can vary.

Additionally, in some examples, the cryptographic secrets the window 502 comprises can be denoted as encryption keys. In an embodiment, the deduplication window can verify that specific encryption keys have not been marked as used (e.g., by updating bits stored in a data structure storing the deduplication window to indicate use); encryption keys that are used cannot be utilized to encrypt and/or decrypt communications a cryptographically protected communications session comprises. For example, an encrypted communications session can comprise two systems sending and/or receiving encrypted messages. A system can send a message, encrypted with an encryption key previously used, to a receiving system. The receiving system can utilize a deduplication window to determine that the encrypted message received has been encrypted with an encryption key not in the deduplication window, which can denote that the encryption key has been previously used. The receiving system can then reject the received encrypted message based on the aforementioned condition.

A cryptographically protected communications session can comprise various parties; these parties can be systems and can each store and/or utilize a deduplication window such as the window 502. In various embodiments, the deduplication window is stored in RAM, perhaps on RAM Disk, present on a system each party comprises. In some examples, a RAM Disk is a block or portion of RAM that is utilized by software as a disk storage drive. It should be noted that in some examples, the deduplication window is not stored on a RAM Disk as described above. For example, the deduplication window can be stored on various data storage systems and/or devices, and can be retrieved following a failure or change of state, or for usage in cryptographically protecting communications.

In an embodiment, the window 502 indicates the allowable range of accepted cryptographic secrets. In some examples, the window 502 can be utilized in the event of a failure or change of state of a cryptographically protected communications session. For example, a cryptographically protected communications session can be established between two parties. During the establishment of cryptographically protected communications session, a primary session secret and secondary session secret can be determined. The secondary session secret can be utilized in a ratcheting scheme, such as a tree ratchet, and can additionally utilize a deduplication window as described in the preceding paragraphs. The cryptographically protected communications session can experience a failure; in response to the failure, the cryptographically protected communications session can be re-established utilizing a secondary session secret ratcheted from the initially determined secondary session secret. To prevent the usage of a compromised secondary session secret by a malicious actor, the cryptographically protected communications session can utilize the deduplication window to reject the compromised secret, and only accept secrets falling within the window 502.

In some examples, a cryptographically protected communications session can be susceptible to interference. The interference can enable a malicious actor to compromise a session secret as well as multiple additional ratcheted session secrets produced as a result of a ratcheting scheme. The malicious actor can then attempt to impersonate a party of the cryptographically protected communications session by utilizing the compromised session secrets. The deduplication window can provide protection against such action by requiring parties of the cryptographically protected communications session to only accept the most current range of ratcheted session secrets, and reject any previously ratcheted secrets which could have been compromised. Thus, the amount of time a compromised secret is usable is limited based on the time that secret remains within the deduplication window. The malicious actor can then be unable to infiltrate the cryptographically protected communications session.

Figure 6:
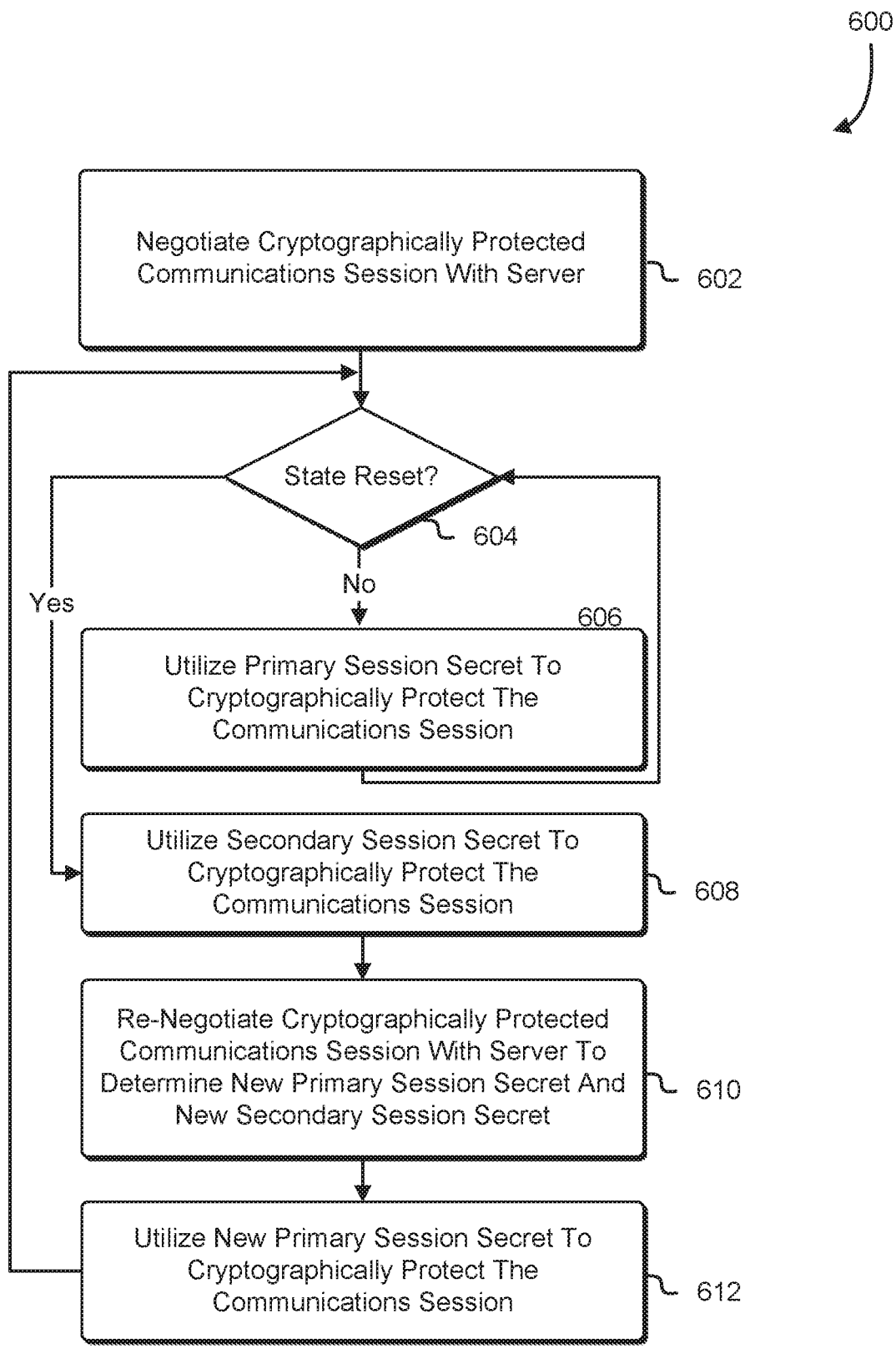
FIG. 6 shows a diagram illustrating a process for a system state reset, in accordance with at least one embodiment.

FIG. 6 illustrates an example of a process 600 that can be performed following the establishment of a cryptographically protected communications session. The process 600 can be performed by any suitable system, such as a client system configured with executable instructions for communicating with one or more other systems. In some examples, the process 600 can be performed by a client system such as the client system described in connection with FIG. 1.

In an embodiment, the process 600 includes negotiate 602 cryptographically protected communications session with server. The negotiation of the cryptographically protected communications session can utilize various methods of protocols or applications such as TLS (transport layer security), SSL (secure sockets layer), SSH (secure socket shell), VPN (virtual private network), and/or variations thereof. The negotiation of the cryptographically protected communications session can determine a cryptographic secret in which a primary session secret and secondary session secret can be derived. In some examples, a session secret can be a cryptographic secret, which can include a cryptographic key, passphrase, secret code, biometric authentication information, other supplemental secret, and/or variations thereof. Additionally, a session secret can be utilized in one or more of the following cryptographic processes: encryption, digital signatures, or otherwise generating data that provides secrecy and/or integrity of the data. Further information regarding the negotiation of a cryptographically protected communications session can be found in the description of FIG. 3.

The system performing process 600 can experience a state 604 reset. A state reset can occur as the result of interference between the system and server; sources of interference can include spectral interference, multipath interference/loss, and/or variations thereof. Interference and loss can also be intentionally caused by inside and/or outside malicious actors. In some examples, a state reset can be the result of a loss of power to a client system and/or server system. A state reset can result in the previously negotiated cryptographically protected communications session experiencing a failure in which one or more aspects of the cryptographic protection can be compromised.

In some examples, the system performing process 600 does not experience a state 604 reset. The system can then continue operation by utilizing 606 primary session secret to cryptographically protect the communications session. In various embodiments, cryptographic protection can utilize one or more of the following cryptographic processes: encryption, digital signatures, or otherwise generating data that provides secrecy and/or integrity of the data. The primary session secret can be utilized as a cryptographic secret in one or more cryptographic processes. For example, a cryptographic secret can be symmetric key of a private key cryptosystem, also known as symmetric key algorithms, which can be used to cryptographically protect communications between the system and server system through a cryptographically protected communications session. The system can continue to utilize 606 primary session secret to cryptographically protect the communications session until a state reset is encountered. Additionally, the primary session secret can be utilized in a tree ratchet structure to cryptographically ratchet to other secrets to continue to cryptographically protect the communications session.

If a state reset occurs, the system can utilize 608 secondary session secret to cryptographically protect the communications session. In an embodiment, the secondary session secret is utilized in place of the primary session secret in the event of a state reset. In some examples, the secondary session secret can be utilized as a symmetric key of a private key cryptosystem to cryptographically protect communications between the system and server system. Additionally or alternatively, the secondary session secret can be utilized in one or more other cryptographic processes, such as encryption, digital signatures, or otherwise generating data that provides secrecy and/or integrity of the data, to cryptographically protect communications between the system and server system. Additionally, like the primary session secret, the secondary session secret can be utilized in a tree ratchet structure to cryptographically ratchet additional secrets to cryptographically protect the communications session.

The system can then re-negotiate 610 cryptographically protected communications session with server to determine new primary session secret and new secondary session secret. In an embodiment, the re-negotiation of the cryptographically protected communications session is done in a manner described in the preceding paragraphs in connection with negotiate 602 cryptographically protected communications session with server. In some examples, the re-negotiation can occur following a set time interval after the state reset. The set time interval (i.e., delay) can be determined through one or more factors, such as the priority of the cryptographically protected communications session, and/or variations thereof. Following the re-negotiation, the system can utilize 612 new primary session secret to cryptographically protect the communications session until a state reset is encountered.

Figure 7:
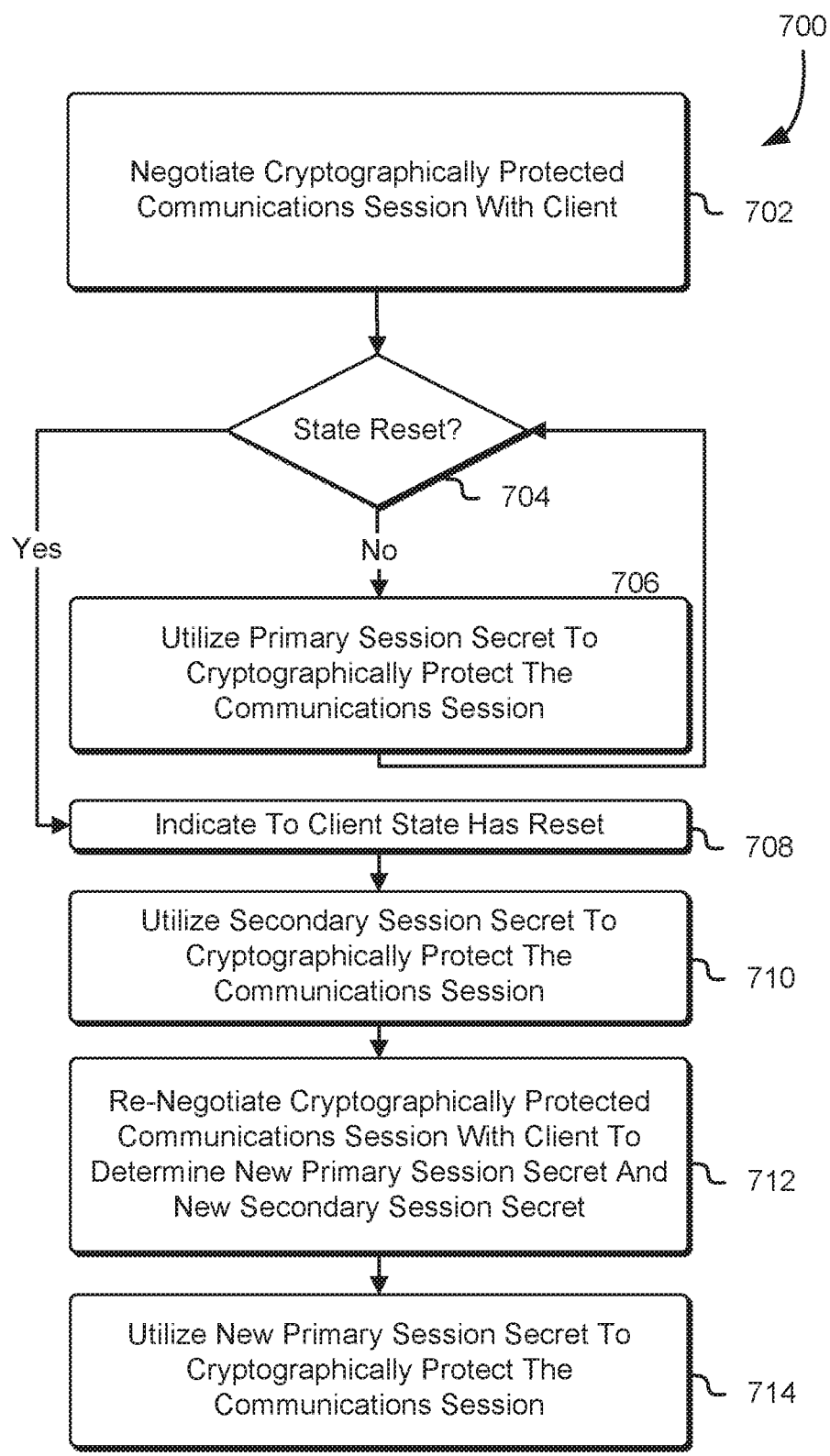
FIG. 7 shows a diagram illustrating a process for a system state reset, in accordance with at least one embodiment.

FIG. 7 illustrates an example of a process 700 that can be performed following the establishment of a cryptographically protected communications session. The process 700 can be performed by any suitable system, such as a server system configured with executable instructions for communicating with one or more other systems. In some examples, the process 700 can be performed by a server system such as the server system described in connection with FIG. 1.

In an embodiment, the process 700 includes negotiate 702 cryptographically protected communications session with client. The negotiation of the cryptographically protected communications session can utilize various methods of protocols or applications such as TLS (transport layer security), SSL (secure sockets layer), SSH (secure socket shell), VPN (virtual private network), and/or variations thereof. The negotiation of the cryptographically protected communications session can determine a primary session secret and secondary session secret. In some examples, a session secret can be a cryptographic secret, which can include a cryptographic key, passphrase, secret code, biometric authentication information, other supplemental secret, and/or variations thereof. Additionally, a session secret can be utilized in one or more of the following cryptographic processes: encryption, digital signatures, or otherwise generating data that provides secrecy and/or integrity of the data. Further information regarding the negotiation of a cryptographically protected communications session can be found in the description of FIG. 3.

The system performing process 700 can experience a state 704 reset. A state reset can occur as the result of interference between the system and server; sources of interference can include spectral interference, multipath interference/loss, and/or variations thereof. Interference and loss can also be intentionally caused by inside and/or outside malicious actors. In some examples, a state reset can be the result of a loss of power to a client system and/or server system. A state reset can result in the previously negotiated cryptographically protected communications session experiencing a failure in which one or more aspects of the cryptographic protection can be compromised.

In some examples, the system performing process 700 does not experience a state 704 reset. The system can then continue operation by utilizing 706 primary session secret to cryptographically protect the communications session. In various embodiments, cryptographic protection can utilize one or more of the following cryptographic processes: encryption, digital signatures, or otherwise generating data that provides secrecy and/or integrity of the data. The primary session secret can be utilized as a cryptographic secret in one or more cryptographic processes. For example, a cryptographic secret can be symmetric key of a private key cryptosystem, also known as symmetric key algorithms, which can be used to cryptographically protect communications between the system and client system through a cryptographically protected communications session. The system can continue to utilize 706 primary session secret to cryptographically protect the communications session until a state reset is encountered. Additionally, the primary session secret can be utilized in a tree ratchet structure to cryptographically ratchet to other secrets to continue to cryptographically protect the communications session.

If a state reset occurs, the system can indicate 708 to client state has reset. In an embodiment, the system indicates the client the state has reset to inform the client to utilize the secondary session secret in place of the primary session secret. In some examples, the system can communicate to a plurality of clients utilizing cryptographically protected communications sessions, in which the system can transmit a notification to a plurality of client systems the plurality of cryptographically protected communications sessions comprises indicating a switch to utilizing the secondary session secret. The notification can utilize the cryptographically protected communications sessions, and can comprise plaintext, ciphertext, and/or variations thereof.

The system can then utilize 710 secondary session secret to cryptographically protect the communications session. In an embodiment, the secondary session secret is utilized in place of the primary session secret in the event of a state reset. In some examples, the secondary session secret can be utilized as a symmetric key of a private key cryptosystem to cryptographically protect communications between the system and client system. Additionally or alternatively, the secondary session secret can be utilized in one or more other cryptographic processes, such as encryption, digital signatures, or otherwise generating data that provides secrecy and/or integrity of the data, to cryptographically protect communications between the system and server system. Additionally, like the primary session secret, the secondary session secret can be utilized in a tree ratchet structure to cryptographically ratchet additional secrets to cryptographically protect the communications session.

The system can then re-negotiate 712 cryptographically protected communications session with client to determine new primary session secret and new secondary session secret. In an embodiment, the re-negotiation of the cryptographically protected communications session is done in a manner described in the preceding paragraphs in connection with negotiate 702 cryptographically protected communications session with client. In some examples, the re-negotiation can occur following a set time interval after the state reset. The set time interval (i.e., delay) can be determined through one or more factors, such as the priority of the cryptographically protected communications session, randomly within set bounds, and/or variations thereof. Following the re-negotiation, the system can utilize 714 new primary session secret to cryptographically protect the communications session.

Figure 8:
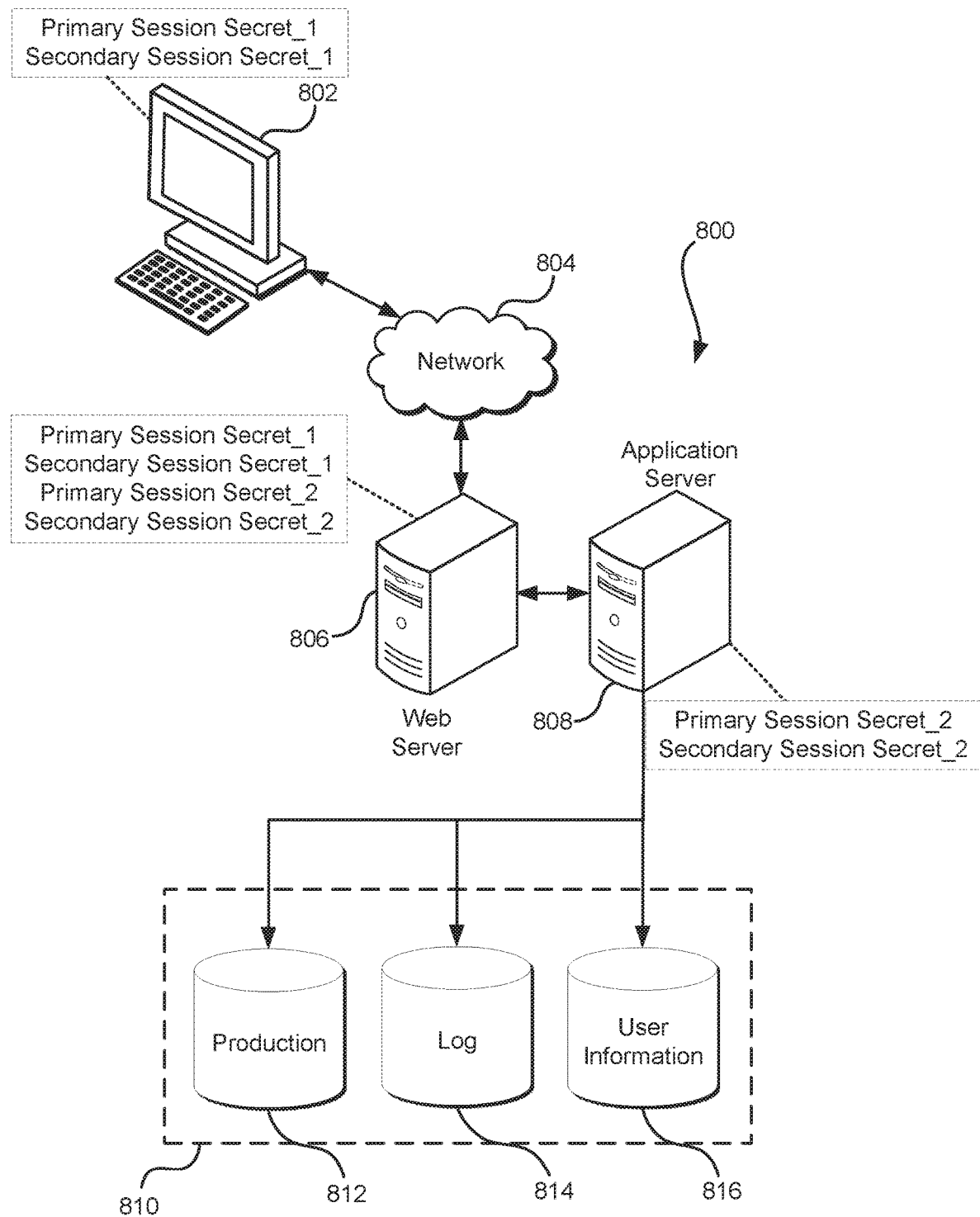
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems can be used, as appropriate, to implement various embodiments. In an embodiment, the system includes an electronic client device 802, which includes any appropriate device operable to send and/or receive requests, messages, or information over an appropriate network 804 and convey information back to a user of the device. In some examples, communications between electronic client device 802 and appropriate network 804 can be a cryptographically protected communications session; both electronic client device 802 and appropriate network 804 can each comprise a primary session secret and secondary session secret utilized to cryptographically protect communications between them. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which can be chained or otherwise configured, which can interact to perform tasks such as obtaining data from an appropriate data store. Additionally, in various embodiments, web server 806 and application server 808 can communicate through a cryptographically protected communications session; the cryptographically protected communications session can utilize a primary session secret and secondary session secret present on both the web server 806 and application server 808. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which can include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. Additionally, the data store 810 can comprise primary session secrets and secondary session secrets utilized to cryptographically protect communication sessions between various entities the data store 810 comprises. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set can be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., can be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments can become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory storing instructions executable by the one or more processors to cause the system to:
perform a handshake of a protocol to establish a first encrypted communications session to be used by a computer system process, the handshake resulting in negotiation of a primary session secret and a secondary session secret;
store the primary session secret in first memory in a first location of volatile memory;
store the secondary session secret in a second location of the volatile memory, wherein an operating system of the system manages the volatile memory such that, in response to a computer system process using the first encrypted communications session being stopped, the operating system clears the primary session secret from the first location without clearing the secondary session secret from the second location;
use the primary session secret for first encrypted communications over the first encrypted communications session;
detect a switch to the secondary session secret for the first encrypted communications session; and
as a result of detecting the switch to the secondary session secret:
use the secondary session secret for second encrypted communications over the first encrypted communications session;
initiate a handshake to establish a second encrypted communications session; and
stop communicating over the first encrypted communications session as a result of the second encrypted communications session being established.

2. The system of claim 1, wherein the second location is a location in a random-access memory (RAM) disk.

3. The system of claim 1, wherein the instructions that cause the system to use the primary session secret for first encrypted communications over the first encrypted communications session are executable to cause the system to:
use the first secret as to generate, using cryptographic ratcheting, a plurality of secrets defining a tree comprising nodes of degree at least two; and
wherein nodes in the tree are used as encryption keys to generate the first encrypted communications.

4. The system of claim 1, wherein:
the instructions that cause the system to initiate the handshake to establish the second encrypted communications session, in response to being executed, cause the system to delay initiation of the handshake to establish the second encrypted communications session.

5. A computer-implemented method, comprising:
determining, by a key agreement algorithm, a first secret and a second secret for a cryptographically protected communications session;
storing the first secret in a first location;
storing the second secret in a second location to be used to replace the first secret for the cryptographically protected communications session, wherein a restart of a process causes a first memory to stop storing the first secret while the second location continues to store the second secret; and
using the first secret for cryptographic protection of communications over the cryptographically protected communications session until detection of a switch to the second secret for the cryptographically protected communications session.

6. The computer-implemented method of claim 5, wherein using the first secret for cryptographic protection for communications over the cryptographically protected communications session comprises generating a first encryption key to encrypt a first message by cryptographically ratcheting a second encryption key corresponding to a second message previously encrypted over the cryptographically protected communications session.

7. The computer-implemented method of claim 5, wherein:
using the first secret for cryptographic protection of communications over the cryptographically protected communications session comprises using a sequence of encryption keys to decrypt respective messages; and
the method further comprises verifying that an encryption key has not been previously used as a condition for decrypting an encrypted message using the encryption key.

8. The computer-implemented method of claim 5, wherein:
using the first secret for cryptographic protection of communications over the cryptographically protected communications session comprises using a sequence of encryption keys to decrypt respective messages; and
the method further comprises verifying that an encryption key has not marked as used within a subsequence of the encryption keys as a condition for decrypting an encrypted message using the encryption key.

9. The computer-implemented method of claim 5, wherein:
both the first location and the second location are directly accessible to a processor of a computer system performing the method; and
the second location is addressable as part of a file system of an operating system.

10. The computer-implemented method of claim 5, wherein:
wherein detection of the switch comprises detection of a deployment to update code of the process; and
the method further comprises using the second secret for second communications over the cryptographically protected communications session as a result of detection of the switch.

11. The computer-implemented method of claim 5, wherein the method further comprises detecting the switch by detecting an indicator of the second secret in a message obtained from another computer system.

12. The computer-implemented method of claim 5, wherein:
storing the first secret in the first location comprises storing the first secret in a first storage device; and
storing the second secret in the second location comprises encrypting the second secret to produce an encrypted second secret and storing the encrypted second secret on a second storage device.

13. A non-transitory computer-readable storage medium storing thereon executable instructions that, as a result of being executed by one or more processors of a computer system, cause the computer system to at least:
store a first secret of a cryptographically protected communications session in a first location;
store a second secret of the cryptographically protected communications session in a second location, wherein stopping a process that utilizes the cryptographically protected communications session causes the first location to stop storing the first secret while an operating system supporting the process continues to store the second secret in the second location; and
replace the first secret with the second secret for cryptographically protecting communications over the cryptographically protected communications session as a result of detecting a switch from the first secret to the second secret.

14. The non-transitory computer-readable storage medium of claim 13, wherein the first location is in a first type of volatile memory and the second location is in a second type of volatile memory that is different from the first type of volatile memory.

15. The non-transitory computer-readable storage medium of claim 13, further comprising instructions executable to cause the system to, as a result of detecting the switch, initiate negotiation of a new cryptographically protected communications session, the negotiation comprising negotiation of a third secret and a fourth secret.

16. The non-transitory computer-readable storage medium of claim 15, further comprising instructions executable to cause the system to delete the second secret from the second location as a result of completion of the negotiation.

17. The non-transitory computer-readable storage medium of claim 13, further comprising instructions executable to cause the system to transmit a notification to multiple computer systems indicating a switch to secondary secrets.

18. The non-transitory computer-readable storage medium of claim 13, further comprising instructions executable to cause the system to distribute a plurality of shares among a plurality of different locations, wherein any subset of shares satisfying a set of quorum conditions is sufficient to obtain the second secret but subsets of shares failing to satisfy the set of quorum conditions are individually insufficient to obtain the second secret.

19. The non-transitory computer-readable storage medium of claim 13, wherein:
the instructions further comprise instructions executable to cause the system to perform a handshake to establish the cryptographically protected communications session, thereby resulting in a negotiated secret; and
derive the first secret and the second secret from the negotiated secret.

20. The non-transitory computer-readable storage medium of claim 13, further comprising instructions executable to cause the system to:
derive encryption keys in a sequence from the first secret using cryptographic ratcheting; and use the cryptographic ratcheting to traverse a tree to obtain an encryption key to encrypt a message for the cryptographically protected communications session, wherein traversing the tree results in skipping over subsequences of the sequence to obtain the encryption key.

* * * * *